USO09656397B2

(12) United States Patent
Huhtala et al.

(10) Patent No.: US 9,656,397 B2
(45) Date of Patent: May 23, 2017

(54) RETRACTABLE KNIFE OR SAW WITH SECURITY HOOK

(75) Inventors: Juha Huhtala, Karjaa (FI); Petteri Masalin, Helsinki (FI)

(73) Assignee: Fiskars Finland Oy Ab, Helsinki (FI)

( * ) Notice: Subject to any disclaimer, the term of this patent is extended or adjusted under 35 U.S.C. 154(b) by 0 days.

(21) Appl. No.: 13/598,334

(22) Filed: Aug. 29, 2012

(65) Prior Publication Data

US 2013/0055573 A1 Mar. 7, 2013

(30) Foreign Application Priority Data

Sep. 1, 2011 (FI) ..................................... 20115855

(51) Int. Cl.
*B26B 1/08* (2006.01)
*B26B 11/00* (2006.01)
*B26B 3/06* (2006.01)
*B26B 5/00* (2006.01)
*B23D 49/10* (2006.01)

(52) U.S. Cl.
CPC ............. *B26B 1/08* (2013.01); *B26B 11/006* (2013.01); *B23D 49/10* (2013.01); *B26B 3/06* (2013.01); *B26B 5/001* (2013.01); *B26B 5/003* (2013.01)

(58) Field of Classification Search
CPC ........... B26B 5/001; B26B 5/003; B26B 1/08; B26B 29/002; B26B 11/006; B26B 3/06
USPC ............................................ 30/153, 155–163
See application file for complete search history.

(56) References Cited

U.S. PATENT DOCUMENTS

| 1,546,709 | A |   | 7/1925  | Bott |
|-----------|---|---|---------|------|
| 1,748,637 | A |   | 2/1930  | Crum |
| 1,853,672 | A | * | 4/1932  | Dodson ........................... 30/162 |
| 4,884,307 | A | * | 12/1989 | Flood ........................ B25F 1/04 |
|           |   |   |         | 30/162 |
| D357,166  | S |   | 4/1995  | Concari |
| 5,584,123 | A | * | 12/1996 | Chi ......................... B23D 51/01 |
|           |   |   |         | 30/125 |
| 5,765,289 | A |   | 6/1998  | Schulz et al. |

(Continued)

FOREIGN PATENT DOCUMENTS

DE 30069 68 A1 9/1981
DE 298137 62 U1 8/1999

(Continued)

OTHER PUBLICATIONS

U.S. Appl. No. 29/388,574, filed Mar. 30, 2011, Block et al.

(Continued)

*Primary Examiner* — Kenneth E. Peterson
*Assistant Examiner* — Nhat Chieu Do
(74) *Attorney, Agent, or Firm* — Foley & Lardner LLP

(57) ABSTRACT

A tool, such as a saw or a knife, includes a hollow handle and a blade member that is movable alternatively into a storage position or a position of use. In the storage position the blade member is surrounded by and protected within the handle. In the position of use the blade member protrudes from the handle as an extension of the handle, with the blade member being lockable in relation to the handle either into the storage position or the position of use. The end of the blade member in the direction of the handle includes a hanger for suspending the tool, the hanger protruding from the handle when the blade member is in the storage position.

2 Claims, 2 Drawing Sheets

(56) References Cited

U.S. PATENT DOCUMENTS

| | | |
|---|---|---|
| 5,822,867 A | 10/1998 | Sakai |
| 5,848,473 A | 12/1998 | Brandenburg, Jr. |
| D414,670 S | 10/1999 | Linden |
| 6,006,433 A * | 12/1999 | Baltazar ............... B26B 5/001 30/152 |
| D444,685 S | 7/2001 | Shenkel et al. |
| 6,363,614 B1 | 4/2002 | Umstead et al. |
| D472,786 S | 4/2003 | Cech et al. |
| D500,240 S | 12/2004 | Fancelli |
| D500,656 S | 1/2005 | Fancelli |
| 7,000,323 B1 * | 2/2006 | Hatcher et al. ............. 30/155 |
| 7,516,550 B2 * | 4/2009 | Hagan et al. ............... 30/162 |
| 7,574,804 B2 * | 8/2009 | Bezold et al. .............. 30/162 |
| 8,006,388 B1 * | 8/2011 | DeJesus ...................... 30/152 |
| 2006/0265883 A1 | 11/2006 | Di Paolo |
| 2006/0277762 A1 * | 12/2006 | Knight ................. B26B 1/02 30/153 |
| 2007/0214656 A1 * | 9/2007 | Gray ........................... 30/295 |
| 2011/0061503 A1 * | 3/2011 | Mayes ........................... 83/13 |

FOREIGN PATENT DOCUMENTS

| | | |
|---|---|---|
| EP | 0 230 000 | 7/1987 |
| EP | 0 396 938 | 11/1990 |
| FR | 2732919 A1 | 10/1996 |
| FR | 2744663 | 8/1997 |

OTHER PUBLICATIONS

U.S. Appl. No. 29/414,264, filed Feb. 27, 2012, Masalin et al.
Fiskars Garden and Camping Saw with belt clip, Wood Preparation Products, Fiskars UK, date retrieved May 18, 2012, 1 page.
Search Report for FI20115855, dated Apr. 20, 2012, 1 page.
European Search Report for Application No. 12182146.3-2313, dated Nov. 20, 2012, 5 pages.

\* cited by examiner

RETRACTABLE KNIFE OR SAW WITH SECURITY HOOK

CROSS-REFERENCE TO RELATED PATENT APPLICATIONS

This application claims the benefit of Finnish Patent Application No. 20115855, filed Sep. 1, 2011, which is incorporated herein by reference in its entirety.

BACKGROUND OF THE INVENTION

The invention relates to a tool, such as a saw or a knife, comprising a hollow handle and a blade member that is movable alternatively into a storage position or a position of use, in the storage position the blade member being surrounded by the handle and protected inside it and in the position of use the blade member protruding from the blade as an extension of the handle, the blade member being lockable by locking means in relation to the handle either into the storage position or the position of use. When the blade member is in the storage position, the handle serves as a casing for the blade member.

A problem with tools of the above type is that the locking means for locking the blade into the storage position are unintentionally open or loose when the tools are to be left hanging in the storage position, and thus the blade member may fall out of the handle, i.e. its casing. The risk of unintentional opening or loosening of the locking means is particularly high when a person is walking and carries a tool hanging in the storage position from a belt of a garment. In that case the locking means are liable to loosen or open.

SUMMARY OF THE INVENTION

An object of the invention is to provide a tool that may be suspended into a storage position and kept suspended in the storage position without a risk of the blade member of the tool unintentionally coming out of the handle.

To achieve this, one embodiment of the invention provides for use a tool, such as a saw or a knife, comprising a hollow handle and a blade member that is movable alternatively into a storage position or a position of use, in the storage position the blade member being surrounded by the handle and protected inside it and in the position of use the blade member protruding from the handle as an extension of the handle, the blade member being lockable by locking members in relation to the handle either into the storage position or the position of use, and an end of the blade member in the direction of the handle comprising a hanger member for suspending the tool, the hanger member protruding from the handle when the blade member is in the storage position.

Preferred embodiments of the invention are disclosed in the attached claims.

An advantage of a tool of the invention is that the tool may be suspended from a belt of a garment, for example, and kept attached to the belt practically without the blade member of the tool unintentionally moving into the position of use.

BRIEF DESCRIPTION OF THE DRAWINGS

In the following, the invention will be described in greater detail with reference to two preferred embodiments and the accompanying drawing, in which.

DETAILED DESCRIPTION OF THE INVENTION

Figure 1:
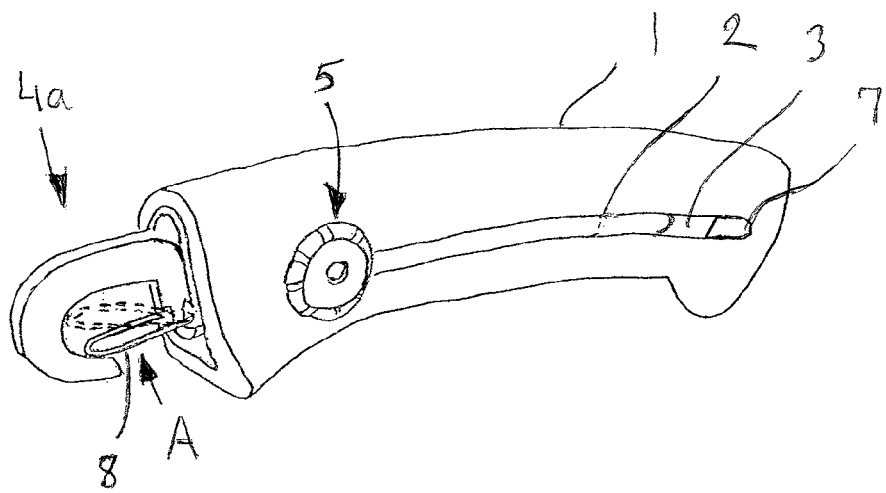
FIG. 1 illustrates a tool in a storage position.

FIG. 1 illustrates a tool in accordance with an exemplary embodiment of the invention in a storage position. The tool is a saw comprising a hollow, sheath-like handle 1 and a blade member 2 arranged into the handle. The blade member 2 is partly visible through a longitudinal guide groove 3 on the handle 1. Reference numeral 4a indicates a hanger member in the form of hook member allowing a saw to be suspended from a belt of a garment, for example. A locking member 5 connects the blade member 2 to the hook member 4a. When the saw and its blade member 2 are in the storage position shown in FIG. 1, the blade member 2 is surrounded and protected by the handle 1.

Figure 2:
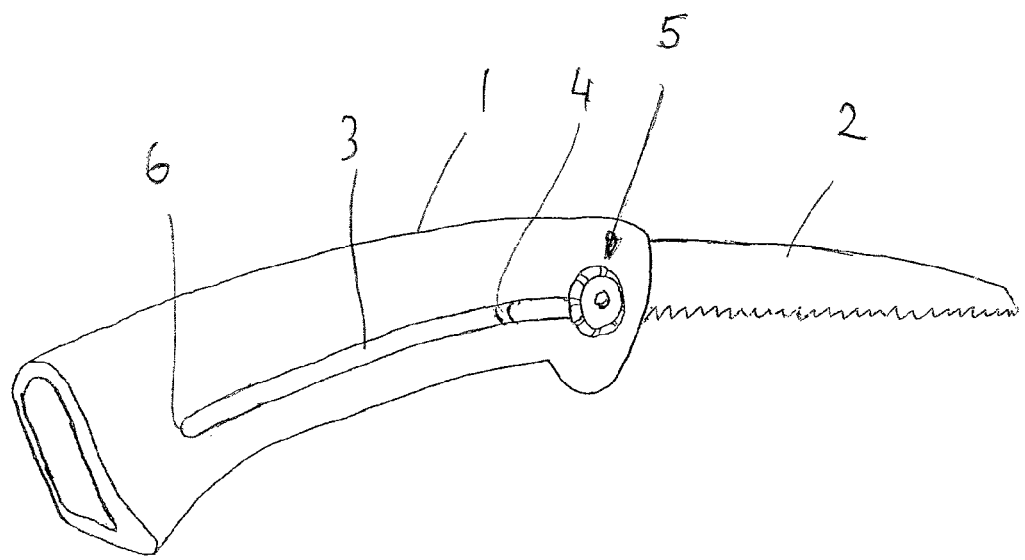
FIG. 2 illustrates a tool in a position of use.

FIG. 2 shows the saw and its blade member 2 in a position of use, in which the blade member 2 protrudes from the handle 1. In the position of use, the hook member 4a is protected inside the casing 1 and, also, is therefore not in the way when the saw is used. The handle 1 forms a protective sheath for the blade member 2 of the tool.

The handle 1 is arranged to guide the blade member 2 when it is moved between the storage position and the position of use in the longitudinal direction of the handle. In the position of use the handle 1 supports the blade member 2.

The saw is brought into the optional positions of FIGS. 1 and 2 by moving the locking member 5 to a first end 6 of the guide groove 3, when the saw is to be brought into the storage position, or, optionally, to a second end 7, when the saw is to be in its position of use. By manually tightening the locking member 5, it becomes locked at the desired end 6, 7 and prevents the blade member 2 from moving along the guide groove.

A spring 8 associated with the hook member 4a exerts a pressing force on the hook member 4a, keeping it in the closed position of FIG. 1 in which the spring 8 presses against the free end of the hook 4a. The hook member 4a is brought into an open position by pressing the spring 8 in the direction of arrow A. In the open position the spring 8 is in the position shown with a broken line, which allows the hook member 4a to be set around the belt (cf. FIG. 6 in which a Velcro strap loop has been placed around the belt). Because of the spring 8 the hook member 4a in the closed position surrounds the belt without a risk of the hook member becoming detached from the belt. It is conceivable to provide a corresponding function by using some other springy member than the spring 8.

Figure 3:
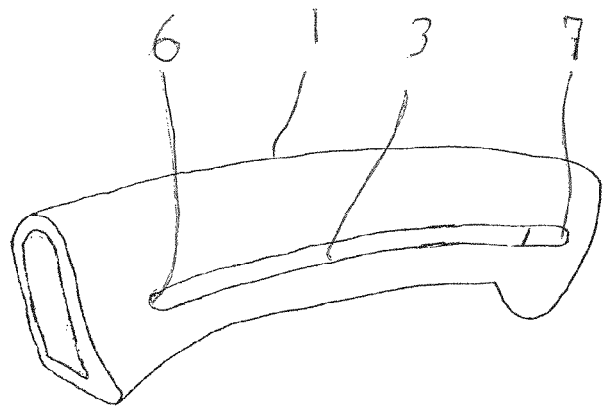
FIG. 3 illustrates a handle of a tool.

FIG. 3 shows the handle 1 of FIG. 1 detached from the blade member 2. As is seen, the handle 1 is hollow and sheath-like.

Figure 4:
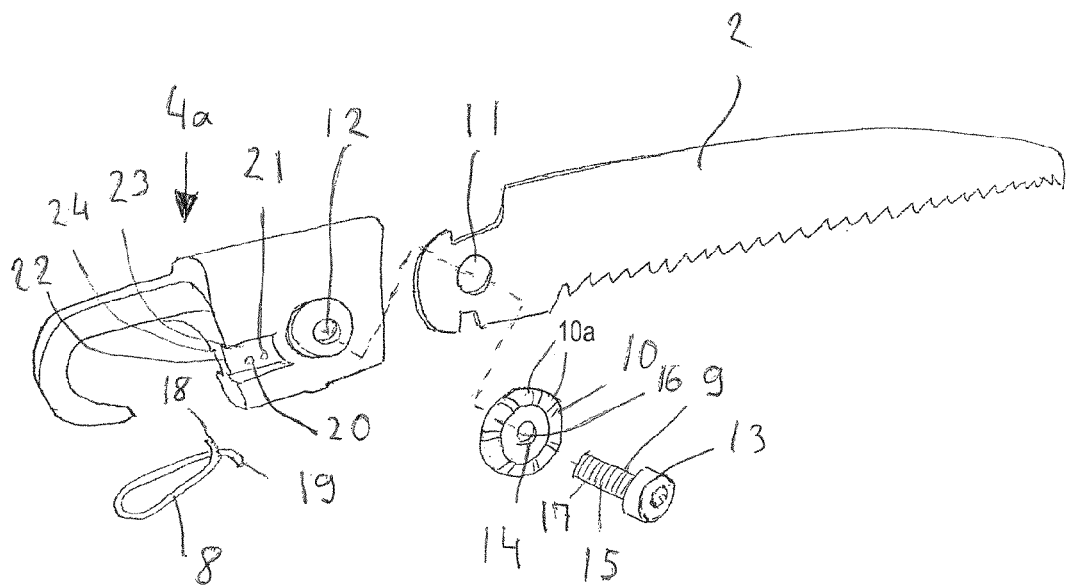
FIG. 4 illustrates a blade member, hanger member and tightening wheel of a tool for fastening the hanger member to the blade member.

In FIG. 4 the blade member 2, hook member 4a, spring 8, screw 9 and tightening wheel 10 of the saw are shown as separate components. The screw has a head 13 whose diameter is greater than an opening 14 in the tightening wheel 10. The rim of the tightening wheel 10 is provided with grooves 10a to allow a better manual hold of the tightening wheel to be taken.

When the saw is ready for use (assembled), the blade member 2 is at least partly inside the handle 1, a shaft part 15 of the screw 9 is inside the tightening wheel 10, the shaft part 15 of the screw 9 being in the guide groove 3 of the handle and inserted through a hole 11 in the blade member 2. In addition, the screw 9 has been tightened into a recess 12 in the hook member 4a, the walls of the recess receiving an end of the shaft part 15. The opening of the tightening wheel 10 is provided with threads 16 that co-operate with threads 17 of the shaft part 15. By turning the tightening wheel 10 in a first direction (preferably clockwise), its inner surface can be made to press against the outer surface of the handle 1, whereby the blade member 2 becomes locked to the handle 1 and cannot be moved in relation to the blade in the longitudinal direction thereof. By turning the tightening wheel 10 in a direction opposite to the first direction, the pressing force of the tightening wheel against the handle 1 decreases and the blade member 2 can be moved in the longitudinal direction of the handle. When the saw is in the storage position, the movement of the screw 9 in relation to the guide groove is prevented by means of the tightening wheel 10 and the shaft part 15 of the screw is against a wall at the end 6 of the guide groove 3, in which case the screw may be said to be locked to the end 6 of the guide groove 3. Correspondingly, when the saw is in the position of use, the screw 9 is locked to the end 7 of the guide groove 3.

When the saw is ready for use (assembled), ends 18, 19 of the spring 8 are in holes 20 and 21, respectively, of the hook member 4a, the spring thus being U-shaped. The holes 20, 21 are in a web part 22 of the hook member 4a, the other side of the web part bordering on support collars 23, 24. The more the spring 8 is pressed in the direction of arrow A of FIG. 1, the more it rests on the support collars 23, 24.

Figure 5:
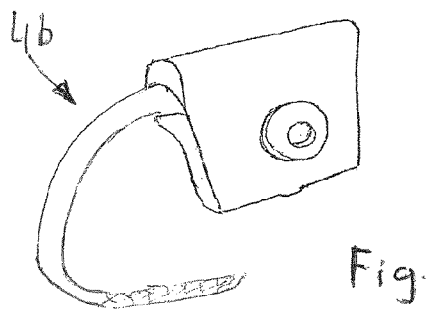
FIG. 5 shows a second embodiment of the hanger member of the tool.

FIG. 5 shows an alternative implementation for the hook member 4a of FIG. 4. The hanger member in FIG. 5 is a hook and loop fastener, e.g. VELCRO brand strap 4b.

Figure 6:
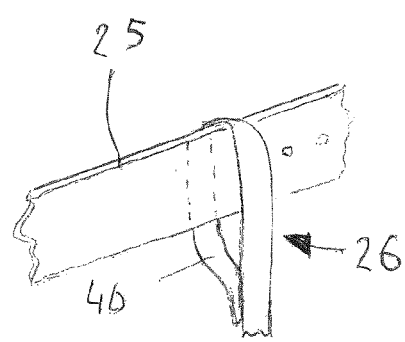
FIG. 6 illustrates fastening of the hanger member of FIG. 5 to a belt of a garment.

FIG. 6 shows how the Velcro strap 4b of FIG. 5 is placed around a belt 25 of a garment so that the Velcro strap 4b forms a loop 26. In the case shown in FIG. 5 there is no spring 8.

In the above, the invention is only described by means of examples, wherefore it is noted that the details of the invention may be implemented in various ways within the scope of the attached claims. Hence the tool of the invention, for example, does not need to be a saw but it may be a knife or some other tool comprising a blade member. The locking means for locking the blade member in relation to the handle may deviate from those disclosed above; for example, the screw 9 may be replaced by some other shaft-like member. The shape of the tool may naturally differ from the one shown here.

What is claimed is:

1. A tool comprising:

a hollow sheath, curved handle and a blade member that is movable alternatively into a storage position or a position of use by a locking member, in the storage position the blade member being surrounded by the handle and protected inside the handle and in the position of use the blade member protruding from the handle as an extension of the handle, the blade member being lockable in relation to the handle either into the storage position or the position of use by the locking member, and a hanger member for suspending the tool, the hanger member being fastened by a screw arranged into a recess in the hanger member and an inline opening in an end of the blade member in a direction of the handle, the hanger member protruding from a first end of the handle when the blade member is in the storage position and the hanger member being protected inside the handle when the blade member is in the position of use;

wherein the blade member is lockable by a way of the locking member, the locking member comprising the screw attached to the blade member and the hanger member, and the screw is arranged to move along a curved, longitudinal guide groove having a first end, and a second end opposite the first end, in the handle for extending and retracting the blade member, and the screw comprises a tightening wheel for manually and optionally locking the screw against the first end or the second end of the guide groove by tightening the screw against the handle;

wherein the hanger member comprises a hook of an openable and closeable hook type, and the hook is provided with a spring member, which in a first position closes the hook and in a second position opens the hook, the spring member having a U-shaped wire having two ends disposed within two adjacent openings in opposite sides of a web portion of the hanger member, the web portion being thinner than the hanger member to allow the spring to slide inside the sheath handle, and the web portion is at least partially defined by at least one support collar on the hanger member, and the spring member bears against the support collar as the spring member is moved toward the second position to open the hook.

2. The tool of claim 1, wherein the handle comprises a protuberance disposed proximate a second end of the handle.

* * * * *